(12) United States Patent
Goubalan et al.

(10) Patent No.: US 10,885,326 B2
(45) Date of Patent: Jan. 5, 2021

(54) CHARACTER RECOGNITION METHOD

(71) Applicant: IDEMIA IDENTITY & SECURITY FRANCE, Courbevoie (FR)

(72) Inventors: Sègbédji Goubalan, Courbevoie (FR); Thierry Viguier, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 61 days.

(21) Appl. No.: 16/415,574

(22) Filed: May 17, 2019

(65) Prior Publication Data

US 2019/0354756 A1 Nov. 21, 2019

(30) Foreign Application Priority Data

May 17, 2018 (FR) ..................................... 18 54139

(51) Int. Cl.
*G06K 9/00* (2006.01)
*G06K 9/20* (2006.01)
*G06T 7/11* (2017.01)
*G06T 5/00* (2006.01)
*G06T 7/13* (2017.01)
(Continued)

(52) U.S. Cl.
CPC ....... *G06K 9/00463* (2013.01); *G06K 9/2072* (2013.01); *G06K 9/48* (2013.01); *G06N 3/08* (2013.01); *G06T 5/007* (2013.01); *G06T 7/11* (2017.01); *G06T 7/13* (2017.01); *G06K 2209/01* (2013.01); *G06T 7/40* (2013.01); *G06T 2207/10008* (2013.01); *G06T 2207/20072* (2013.01); *G06T 2207/20084* (2013.01); *G06T 2207/30176* (2013.01)

(58) Field of Classification Search
CPC ........... G06K 2209/01; G06K 9/00442; G06K 9/00463; G06K 9/2072; G06K 9/4642; G06K 9/48; G06K 9/525; G06K 9/6267; G06N 3/08; G06T 2207/10008; G06T 2207/20072; G06T 2207/20084; G06T 2207/30176; G06T 5/007; G06T 7/11; G06T 7/13; G06T 7/40
See application file for complete search history.

(56) References Cited

U.S. PATENT DOCUMENTS 9,235,757 B1 1/2016 Liu et al.
9,830,508 B1 * 11/2017 Winder ................ G06K 9/4604
(Continued)

FOREIGN PATENT DOCUMENTS

WO WO-2017/058252 A1 4/2017

OTHER PUBLICATIONS

Search Report of corresponding French application FR1854139, 7 pages.

*Primary Examiner* — Bobbak Safaipour
(74) *Attorney, Agent, or Firm* — Muncy, Geissler, Olds & Lowe, P.C.

(57) ABSTRACT

A method for recognizing characters in an image of a document having at least one alphanumeric field. The method has the steps of: segmenting the image to identify objects therein; defining a bounding box around each object; making multiple successive selections based on different descriptors and dividing the bounding boxes into a plurality of cells for each of which a texture descriptor is determined as a gradient oriented histogram; performing character recognition on the finally selected bounding boxes. A device for implementing the method.

15 Claims, 3 Drawing Sheets

(51) Int. Cl.
*G06K 9/48* (2006.01)
*G06N 3/08* (2006.01)
*G06T 7/40* (2017.01)

(56) References Cited

U.S. PATENT DOCUMENTS

| | | | |
|---|---|---|---|
| 10,216,973 B2 * | 2/2019 | Kazdaghli | G06T 7/11 |
| 10,217,008 B2 * | 2/2019 | Boulanger | G06K 9/00087 |
| 10,719,700 B1 * | 7/2020 | Brown | G06F 16/5846 |
| 2006/0045322 A1 | 3/2006 | Clarke et al. | |
| 2007/0201757 A1 * | 8/2007 | Madej | G06Q 20/208 |
| | | | 382/254 |
| 2013/0182002 A1 * | 7/2013 | Macciola | H04N 1/387 |
| | | | 345/589 |
| 2013/0272579 A1 * | 10/2013 | Burry | G06K 9/3258 |
| | | | 382/105 |
| 2019/0354791 A1 * | 11/2019 | Goubalan | G06K 9/4638 |
| 2020/0250417 A1 * | 8/2020 | Torres | G06F 40/295 |

\* cited by examiner

CHARACTER RECOGNITION METHOD

This invention relates to the field of image processing for the purpose of recognising characters in any written document such as a transport ticket or an identity document.

BACKGROUND OF THE INVENTION

Field of the Invention

An identity document, such as a passport or a national identity card, includes text fields containing, in the form of alphanumeric characters, for example, the surname, forenames, date and place of birth of the holder of the identity document, as well as the name of the authority that issued the identity document and the date of issue.

Some administrative operations require a facsimile of the document and the content of at least some of these fields to be re-entered. To speed up processing, it is known to scan the document and extract the content of the text fields using a computer program implementing a character recognition algorithm.

It is also known to add security features to these documents to complicate the falsification and unauthorized reproduction of this document. These security features are often present in the background of the document and include, for example, settings or thin lines forming patterns or characters.

However, these security features, particularly when they are highly contrasted and close to a text field, are sometimes interpreted as characters by the character recognition program. This results in errors that are detrimental to the efficiency of the image processing applied to the documents and consequently to the completion of administrative formalities.

SUMMARY OF THE INVENTION

One of the aims of the invention is to provide a means for making character recognition more reliable, particularly when the background is heterogeneous and/or when the background is not known a priori.

To this end, according to the invention, a method is provided for recognizing characters in an image of a document containing at least one alphanumeric field, the method comprising the steps of:
  segmenting the image to identify objects therein;
  defining a bounding box around each object and making a first selection to select the bounding boxes supposedly containing a character based on at least one theoretical dimensional characteristic of an alphanumeric character;
  making a second selection comprising applying shape descriptors to each selected bounding box and implementing a decision making algorithm to select, on the basis of the descriptors, the bounding boxes supposedly containing a character;
  grouping the bounding boxes according to relative positions of the bounding boxes;
  making a third selection by dividing each of these bounding boxes into a plurality of cells for each of which a texture descriptor in the form of an histogram of oriented gradient is determined, the histograms then being concatenated and a decision making algorithm being implemented to select, on the basis of the descriptors, the bounding boxes supposedly containing a character;
  performing a character recognition on the finally selected bounding boxes.

The method of the invention makes it possible, without human intervention, to limit the influence of the background of the image and the digitization artefacts on the extraction of alphanumeric characters present in the image, thus improving the reliability of the automatic character recognition. This also makes it possible to perform a character recognition even from a digitization with a quality that would have been considered insufficient to perform a character recognition using prior art methods.

The invention also relates to a character recognition device comprising a computer unit provided with the means for the connection thereof to a digitization apparatus arranged to digitize a written document. The computer unit includes at least a processor and a memory containing a program implementing the method according to the invention.

Other characteristics and advantages of the invention will become apparent from reading the following description of a particular non-restrictive embodiment of the invention.

BRIEF DESCRIPTION OF THE DRAWINGS

Reference is made to the appended drawings, wherein.

DETAILED DESCRIPTION OF THE PREFERRED EMBODIMENTS

Figure 1:
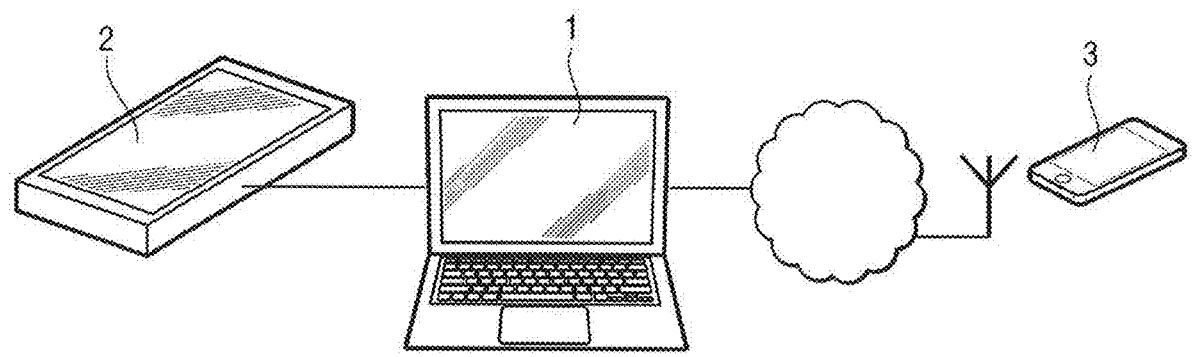
FIG. 1 shows a schematic view of a device for implementing the method of the invention.

With reference to FIG. 1, the method of the invention is carried out by means of a device comprising a computer unit 1 connected to a digitizing apparatus arranged to digitize a written document. The computer unit 1 is a computer that includes at least a processor and a memory containing an image acquisition program and a program implementing the method of the invention. The processor is designed to run these programs. The digitizing device is for example a scanner 2 dedicated to the digitization of written documents (commonly called a flatbed scanner), or an image sensor of a communication terminal such as "smartphone" 3 that can be connected to the computer unit 1 via a network such as the Internet. The scanner 2 is directly controlled by the computer unit 1 to acquire the image of the document. Alternatively, the scanner 2 can be connected to another computer unit that will control the image acquisition and send the image to the computer unit 1, which will perform the image processing and the character recognition itself. In the case of a capture by the smartphone 3, the user orders the acquisition of the image of the document written directly from the smartphone 3 and then transmits this image to the computer unit 1 so that the latter can process the image and recognize the characters proper. The digitizing device is in all cases so arranged as to capture an image of the written document with sufficient resolution to extract alphanumeric characters that would be present in the image and to recognize said characters.

The written document is here more particularly an identity document such as an identity card or a passport.

Figure 2:
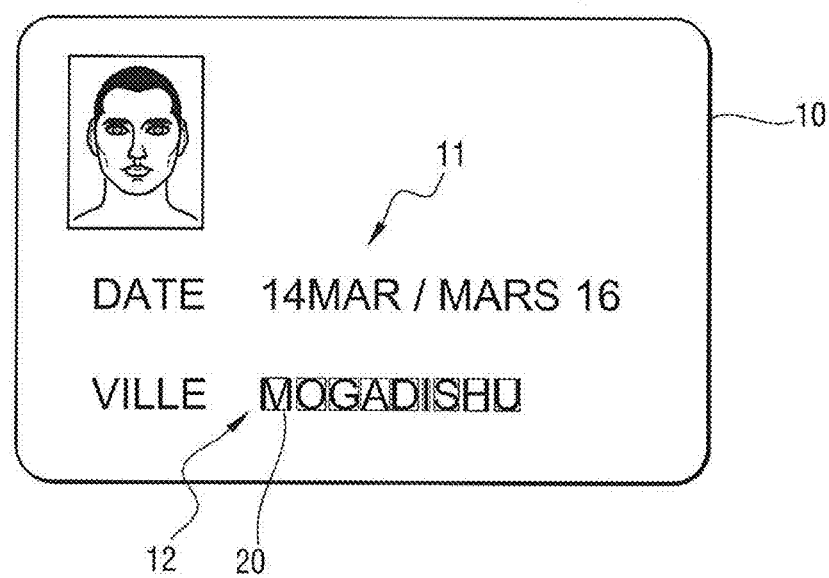
FIG. 2 is a schematic view of an image of a document including characters which can be recognized using the method according to the invention.

FIG. 2 shows an image 10 of this identity document. The image 10 was captured by the digitizing device. In this image 10, it can be seen that the identity document includes a photograph of its holder and alphanumeric character fields, namely here a field "Date" 11 and a field "City" 12. Obviously, the identity document actually contains other alphanumeric character fields—such as "Name", "First names", "Date of birth", "Place of birth", "Nationality", "Address", "End date of validity"—which have not been represented here. In the rest of the description, the word "characters" alone will be used to designate alphanumeric characters. The identity document also contains security or decorative elements that may interfere with the written characters (not shown in FIG. 2).

Figure 3:
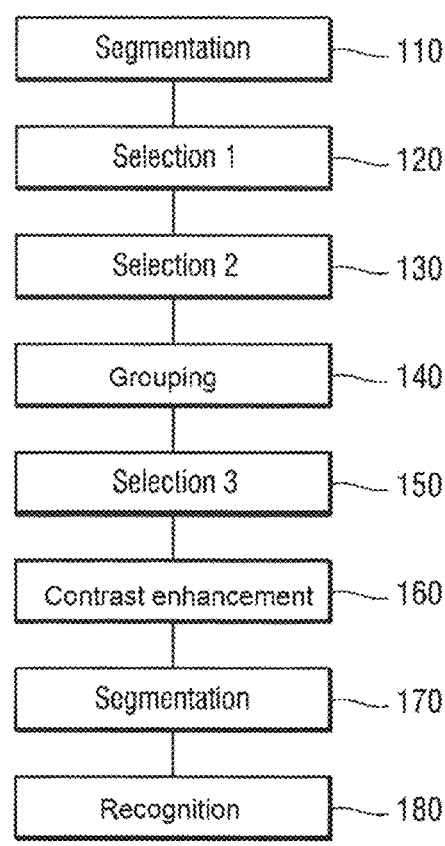
FIG. 3 is a diagram illustrating the various steps of the method according to the invention.

The method of the invention implemented by the program executed by the computer unit 1 includes the following steps (FIG. 3):

segmenting the image to identify objects therein (step 110);

defining a bounding box 20 around each object and making a first selection to select the bounding boxes supposedly containing a character based on at least one theoretical dimensional characteristic of an alphanumeric character (step 120);

making a second selection comprising applying shape descriptors to each selected bounding box and implementing a decision making algorithm to select, on the basis of the descriptors, the bounding boxes supposedly containing a character (step 130);

grouping the bounding boxes according to the relative positions of the bounding boxes (step 140);

making a third selection by dividing each of these bounding boxes into a plurality of cells for each of which a texture descriptor in the form of a histogram of oriented gradient is determined, the histograms then being concatenated and a decision making algorithm being implemented to select, on the basis of the descriptors, the bounding boxes supposedly containing a character (step 150);

improving the image contrast and detecting contours of objects in the image to create a mask that highlights the characters (step 160);

segmenting the image by applying the mask to the image to extract the objects visible through the mask (step 170);

performing a character recognition on the finally selected bounding boxes (step 180).

These steps will now be disclosed in greater details.

The step 110 here consists in applying a sequential alternating filter to the image, which is a mathematical morphological filter. In practice, the program scans the image with a geometric window (commonly called a structuring element) that is circular (but which could be rectangular or even linear or any other shape) with a radius of 5 to 10 pixels and eliminates everything that fits entirely within said window (operation commonly called erosion) and expands any part of an object that does not fit entirely within the window. Given the dimensions of the window, a character will not fit entirely inside the window and will therefore be expanded, the rest is necessarily noise and is eliminated. Preferably, several passes are made while increasing the window dimensions between each of these to gradually filter the image noise. Alternatively, this step can be performed by implementing an MSER (Maximally stable extremal regions) algorithm or by filtering the image using a threshold corresponding to a theoretical intensity of a character (when the threshold is reached, the object is considered as a character; when the threshold is not reached, the object is not a character).

Upon completion of this step, the program therefore highlighted objects (which could also be called connected components) which include alphanumeric characters as well as other objects which include elements that are not, such as security or decoration elements. Nevertheless, at this stage, a significant proportion of these undesirable elements have been excluded.

In step 120, on each of the objects remaining in the image, the program applies a bounding box 20 (visible in FIG. 2) respecting several theoretical geometric criteria of the characters, namely: height, width and/or a dimension ratio (or AR "aspect ratio"; height/width for example). If an object, and therefore its bounding box 20, has a height and a width (or a ratio thereof) corresponding to the theoretical ones of a character, it is an alphanumeric character. It is therefore possible to select objects that can correspond to characters on the basis of geometric criteria.

To automatically select objects corresponding to alphanumeric characters in step 130, the program implements a decision making algorithm (or more commonly called a classifier). On each object selected beforehand, several types of shape descriptors are determined, namely here:

Fourier moments,

Krawchuk moments.

It should be reminded that a moment is a formula applied to a pixel or a set of pixels to describe the structure at issue, namely a character. Other descriptors could be used instead of or in addition to Fourier moments and/or Krawtchouk moments. However, the combined use of these two types of descriptors gives remarkable results.

Fourier moments are used in a classifier (here SVM "Support Vector Machine" type) to produce a first character/non-character output.

Krawchuk moments are used in a classifier (again of the SVM type) to produce a second character/non-character output.

These two outputs are then concatenated to form an input vector of a classifier (again of the SVM type) providing a third output. This third output is compared to a threshold to provide a binary decision: "character" or "no character". Preferably, to form the input vector, the first output and the second output are weighted for each object, for example according to the performance of the descriptors, given the type of background.

Following this operation, an image is obtained containing the objects that are mostly devoid of any possible tasks and noise initially present in the image, often due to the presence of the document security or decoration elements.

In step 140, the program groups the characters into one or more word(s) or line(s) of text according to geometric criteria that, in addition to the height, width and/or dimension ratio AR, include(s) the centroids (or barycentres) of the bounding boxes 20 associated with each character. More precisely, the program detects if the centroids are aligned on the same line and calculates the distances between the centroids and the bounding boxes 20 associated with adjacent characters to determine if they belong to the same word. The grouped characters are associated in a collective bounding box.

In step 150, the program examines the contents of each collective bounding box and eliminates those that do not appear to contain a text field. Indeed, during the phases described above, lines may inadvertently be formed by grouping objects, at least one of which is not a character. This step therefore eliminates false positives.

It is known that different regions of text have different distributions of gradient orientations: the reason is that high amplitude gradients are generally perpendicular to the contours that form the characters. For this step, the program uses a texture descriptor based on a Histogram of oriented gradient (HOG) that is known in text recognition. Classically:
- the area to be recognized is subdivided into Nl lines and Nc columns globally on the image,
- a histogram is calculated on each of the Nl×Nc cells,
- the histograms are concatenated with each other for the entire image.

According to the method of the invention, the program is advantageously arranged to subdivide the bounding box 20 of each object into 3 lines and 1 column because this division significantly improves the "word" or "not word" decision. Thus, a histogram is calculated on each of the three cells of each bounding box 20 containing a priori a character. The histograms are then concatenated with each other and entered into a classifier (again of the SVM type) to decide whether the collective bounding box corresponds to text. It should be noted that the breakdown is highly dependent on the size of the characters. The bounding box 20 in which the cutting is performed must have the size of each character (if the bounding box 20 of a character is 28 pixels×28 pixels initially but the character occupies only 50% thereof, the box is resized so that the character occupies all of it, then the cutting is completed).

Figure 4A:
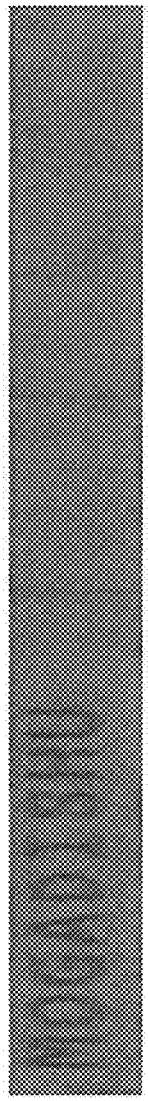
FIGS. 4a and 4b are detailed views of this image before and after contrast enhancement.
Figure 4B:
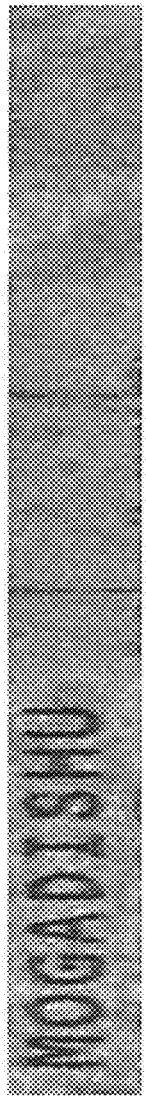
Figure 5A:
FIGS. 5a and 5b are detailed views of this image before and after contrast enhancement.
Figure 5B:
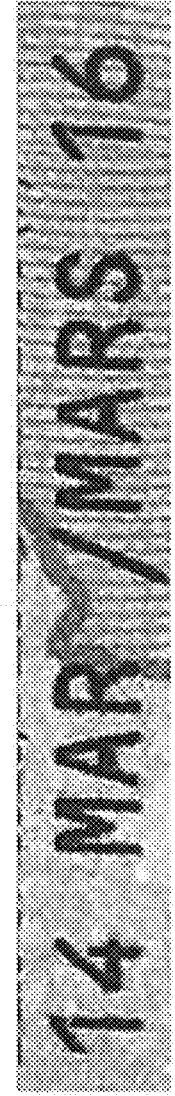

In step 160, the program performs, in each collective bounding box, a color analysis of the image (two parts of the image before this step is performed are represented in FIGS. 4a and 5a): the objective here is to saturate the large differences in the image and to amplify the small differences by saturating the color channels (RGB, i.e. red, green, blue) to bring out the color of the characters (in the case of a black and white image, the grey levels will be affected). To do this, the program performs a contrast enhancement which consists in locally adapting the image contrast by lateral inhibition—difference of neighboring pixels—weighted by the Euclidean distance between the pixels. Only the strongest gradients are retained. Finally, the program also adapts the image to obtain an overall white balance (see the two parts of the image after step 160 in FIGS. 4b and 5b). This step improves the contrast and corrects the color. Alternatively, a histogram equalization algorithm could have been used, but such an algorithm produces artefacts and artificial colors in the images background that may complicate further processing of the image.

The step 170 is intended to remove the background from the image in order to eliminate any background element contained therein, such as security or decoration elements, that may subsequently affect the character recognition.

Figure 5C:
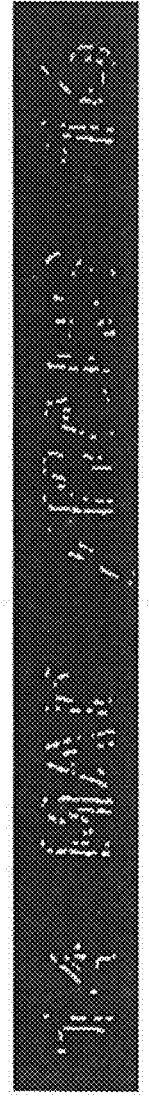
FIGS. 5c and 5d are detailed views of this image during image segmentation using a mask.
Figure 5D:
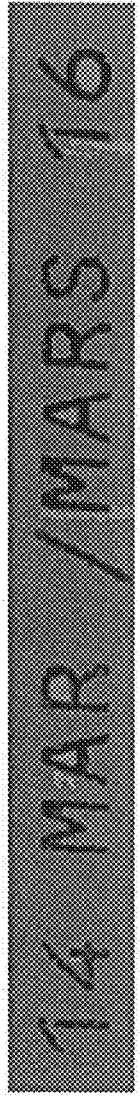

The previous step made it possible to improve the color of the image and to saturate the black characters. This makes it easier to detect the character contours. The method of the invention implemented by the program uses a contour detection filter and more particularly a Sobel filter for this purpose. The output image (FIG. 5c) is then used as a mask in a connected components tree segmentation approach. In general, connected component trees associate a grayscale image with a descriptive data structure induced by an inclusion relationship between the binary connected components obtained by successive applications of the level lines. Using the mask makes it possible to select, in the tree only what relates to the characters. This selection is automatically performed so that the connected components tree segmentation can be automatically performed, without human intervention, whereas, traditionally, the connected components tree segmentation involves an interactive process with an operator. The segmentation of a field by the method of the invention can thus be carried out much more quickly than with the traditional method. Tests conducted by the Applicant showed that the segmentation by the method of the invention was faster in a ratio greater than 60 or even 70. Thus, the segmentation according to the invention reduces the computing time.

The character recognition performed by the program in step 180 can implement any character recognition algorithm. More specifically, the program applies a word segmentation and recognition model based on a deep learning architecture based on a combination of convolutional neural networks (CNN) and LSTMs (CNN for Convolutional Neural Network, LSTM for Long-, Short-Term Memory). In this case, the convolution neural network gives particularly good results because the background of the image was removed before its implementation. This elimination of the background reduces the rate of false positives during the OCR; and in particular avoids the appearance of ghost characters, i.e. patterns from the background and/or security or decorative elements, which have a shape close to that of a character and are incorrectly recognized as a character during the OCR.

Preferably, a multi-scale approach should be used as an alternative. Indeed, the characters which are larger than the window used in step 110 are often over-segmented. To avoid this disadvantage, the method according to the invention provides for steps 110 and 120 to be carried out at different resolutions, with the dimensions of the window remaining identical. In practice, the program performs several scanning passes and reduces the resolution after each pass to eliminate all the objects that do not fit entirely into the window but have smaller sizes than a character. For example, the initial resolution is 2000×2000 pixels and five decreases in resolution are made (the resolution is halved each time). A number of five decreases represents a good compromise between efficiency and computing time.

It should be noted that the relevant geometric criteria for character grouping and the choice of different parameters for effective word detection have been selected in order to have an effective set of parameters for each type of image (depending on the wavelength range used for scanning: visible, IR and UV).

Of course, the invention is not limited to the described embodiment but encompasses any alternative solution within the scope of the invention as defined in the claims.

In particular, the method has been described in its most efficient version regardless of the digitizing device used.

For a digitization with a flatbed scanner, the method of the invention may include only the following steps:
- enhancing a contrast of the image;
- detecting contours of objects in the image to create a mask that highlights the characters;
- segmenting the image by applying the mask to the image to extract the objects visible through the mask;
- performing a character recognition on the extracted objects.

For a digitization with a smartphone, the method of the invention may include only the following steps:

segmenting the image to identify objects therein;
defining a bounding box around each object and making a first selection to select the bounding boxes supposedly containing a character based on at least one theoretical dimensional characteristic of an alphanumeric character;
making a second selection comprising applying shape descriptors to each selected bounding box and implementing a decision making algorithm to select, on the basis of the descriptors, the bounding boxes supposedly containing a character;
grouping the bounding boxes according to relative positions of the bounding boxes;
making a third selection by dividing each of these bounding boxes into a plurality of cells for each of which a texture descriptor in the form of a histogram of oriented gradient is determined, the histograms then being concatenated and a decision making algorithm being implemented to select, on the basis of the descriptors, the bounding boxes supposedly containing a character;
performing a character recognition on the finally selected bounding boxes.

In all cases, the multi-scale approach is optional.

It is possible to combine several classifiers. Or to use other classifiers than those indicated. Preferably, each classifier used will be of a type included in the following group: SVM ("Support Vector Machine"), RVM ("Relevance Vector Machine"), K nearest neighbours (or KNN), Random Forest. It should be noted, for example, that the RVM classifier allows a probabilistic interpretation that allows fewer examples for the learning phase.

It is possible to group by line or word. For example, the type of document will be taken into account: for example, on identity documents of British origin, there are sometimes large spaces between the letters that leave the background very apparent: it is more efficient to group by word for this type of document.

For step 150, other breakdowns are possible, in particular 1 column and 7 lines.

The images can be processed in color or in a grayscale. In a grayscale, using the mask eliminates a large number of parasitic elements.

Alternatively, several other segmentation solutions could have been considered such as global or adaptive thresholding, a Gaussian mixture or any other technique to effectively isolate the characters in the image.

Krawchuk moments can be used alone or in combination with other types of moments and for example shape descriptors also based on moments among the following: Fourier, Legendre, Zernike, Hu moments and descriptors extracted by a LeNet convolution neural network. It should be noted that Krawchuk moments become effective descriptors for characters using order 9 polynomials whereas order 16 polynomials are required for Legendre moments, 17 for Zernike moments and more than 30 for Fourier moments.

It should be noted that the method of the invention is particularly well suited for processing documents with heterogeneous backgrounds. The method can be implemented in the same way for processing documents with homogeneous backgrounds. It is also possible to plan a preliminary step to determine if the background of the document is homogeneous and, if so, to skip the steps of contour detection and mask segmentation. This segmentation is mainly useful because it eliminates a large part of the background of the document that could alter character recognition. However, with a homogeneous background, this risk is limited. Another type of segmentation may be considered.

The sensor may have a structure different from the one described. In particular, the image acquisition program can be stored in a memory of the capture device to be executed directly by the latter. The device and the capture device can be incorporated into the same device.

The invention claimed is:

1. A method for recognizing characters in an image of a document comprising at least one alphanumeric field, the method comprising the steps consisting in:
    segmenting the image to identify objects therein;
    defining a bounding box around each object and making a first selection to select the bounding boxes supposedly containing a character based on at least one theoretical dimensional characteristic of an alphanumeric character;
    making a second selection comprising applying shape descriptors to each firstly selected bounding box and implementing a decision making algorithm to select, on the basis of the descriptors, the firstly selected bounding boxes supposedly containing a character;
    grouping the secondly selected bounding boxes according to relative positions of the secondary selected bounding boxes;
    making a third selection by dividing each of these secondly selected bounding boxes into a plurality of cells for each of which a texture descriptor in the form of an histogram of oriented gradient is determined, the histograms then being concatenated and a decision making algorithm being implemented to select, on the basis of the descriptors, the secondly selected bounding boxes supposedly containing a character;
    performing a character recognition on the thirdly selected bounding boxes.

2. The method according to claim 1, wherein the shape descriptors are based at least on Krawchuk moments.

3. The method according to claim 2, wherein the shape descriptors are also based on Fourier, Legendre, Zernike, Hu moments and descriptors extracted by a LeNet convolution neural network.

4. The method according to claim 2, wherein the second selection includes:
    the application of shape descriptors based on Fourier moments and the implementation of a decision making algorithm to obtain a first output,
    the application of shape descriptors based on Krawchuk moments and the implementation of a decision making algorithm to obtain a second output,
    weighting the outputs to form an input vector of a decision making algorithm having a third output compared to a threshold to decide whether or not a character exists.

5. The method according to claim 1, wherein the dimensional characteristic used in the first selection is a dimension ratio.

6. The method according to claim 1, wherein the grouping of the bounding boxes is carried out by determining a barycentre of each bounding box, and by determining whether the barycentres are on the same line taking into account a spacing between the barycentres.

7. The method according to claim 1, wherein the histogram is determined according to the HOG method with a division of the bounding box into three lines and one column, i.e. three cells.

8. The method according to claim 1, wherein at least one of the decision making algorithms is of a type selected from the following group: SVM, RVM, KNN or Random Forest.

9. The method according to claim 1, wherein the segmentation is carried out by scanning the image with a window having dimensions smaller than the theoretical dimensions of a character, eliminating any object entering the window entirely and expanding any part of an object not entering the window entirely.

10. The method according to claim 8, wherein the segmentation is performed at several resolutions; the method comprising the step of, for each resolution, removing any object not entirely within the window, the window remaining of the same size.

11. The method according to claim 10, wherein the number of resolutions is at most equal to five.

12. The method according to claim 1, wherein the character recognition is performed by a neural network.

13. The method according to claim 12, wherein the neural network is of the convolution type with short- and long-term memory.

14. The method according to claim 1, comprising, prior to the character recognition, the steps of:
- enhancing an image contrast to highlight the characters in the image;
- detecting contours of objects in the image to create a mask that highlights the characters;
- segmenting the image using a tree with connected components and applying the mask to it in order to extract the characters from the image.

15. A character recognition device comprising a computer unit provided with means for the connection thereof to a scanning apparatus arranged to perform a scanning of a written document, wherein the computer unit comprises at least one processor and a memory containing a program implementing the method according to claim 1.

* * * * *